United States Patent
You et al.

(10) Patent No.: US 11,424,532 B2
(45) Date of Patent: *Aug. 23, 2022

(54) STRUCTURE AND ALIGNMENT METHOD OF ARRAY ANTENNAS FOR VEHICLE RADAR

(71) Applicant: MANDO MOBILITY SOLUTIONS CORPORATION, Gyeonggi-do (KR)

(72) Inventors: Kyung Jin You, Gyeonggi-do (KR); HaeSueng Lim, Gyeonggi-do (KR); Yun Ki Han, Gyeonggi-do (KR); Seong Hee Jeong, Gyeonggi-do (KR)

(73) Assignee: MANDO MOBILITY SOLUTIONS CORPORATION, Gyeonggi-Do (KR)

( * ) Notice: Subject to any disclaimer, the term of this patent is extended or adjusted under 35 U.S.C. 154(b) by 350 days.

This patent is subject to a terminal disclaimer.

(21) Appl. No.: 16/719,623

(22) Filed: Dec. 18, 2019

(65) Prior Publication Data

US 2020/0203824 A1 Jun. 25, 2020

(30) Foreign Application Priority Data

Dec. 20, 2018 (KR) .................... 10-2018-0166020

(51) Int. Cl.
| | | |
|---|---|---|
| *H01Q 1/52* | (2006.01) | |
| *H01Q 1/22* | (2006.01) | |
| *H01Q 1/32* | (2006.01) | |
| *H01Q 21/06* | (2006.01) | |
| *H01Q 21/08* | (2006.01) | |
| *H01Q 21/28* | (2006.01) | |
| *G01S 13/931* | (2020.01) | |

(52) U.S. Cl.
CPC .......... *H01Q 1/523* (2013.01); *H01Q 1/2275* (2013.01); *H01Q 1/325* (2013.01); *H01Q 1/3233* (2013.01); *H01Q 21/065* (2013.01); *H01Q 21/08* (2013.01); *H01Q 21/28* (2013.01); *G01S 13/931* (2013.01)

(58) Field of Classification Search
CPC ...... H01Q 1/3233; H01Q 1/325; H01Q 1/523; H01Q 1/525; H01Q 1/2275; H01Q 21/065; H01Q 21/08; H01Q 21/28; G01S 13/931; G01S 7/03; G01S 2013/0245
See application file for complete search history.

(56) References Cited

U.S. PATENT DOCUMENTS

2017/0363713 A1* 12/2017 Kim ................. G01S 13/931
2018/0341005 A1* 11/2018 Yoo ................. H01Q 21/065

FOREIGN PATENT DOCUMENTS

| | | |
|---|---|---|
| JP | 5318199 | 10/2013 |
| KR | 10-2017-0092906 | 8/2017 |
| KR | 10-2017-0142560 | 12/2017 |

* cited by examiner

Primary Examiner — Robert Karacsony
(74) Attorney, Agent, or Firm — Ladas & Parry, LLP

(57) ABSTRACT

Provided are a structure and alignment method of array antennas for a vehicle radar, the structure and method being able to adjust the locations, number of channels, number of arrays, and channel distance according to the type of antennas, so as to minimize a space occupied by the antennas while maintaining the radiation efficiency of the antennas. Even in a case in which conditions regarding the location of the array antennas and the number of channels are changed within designated ranges, the efficient array antenna structure minimizes the area of array antennas for a vehicle while maintaining the detection ability of the array antennas.

20 Claims, 24 Drawing Sheets

FIG.3

| | Location of Antenna | Number of Channels | Number of Array Antennas per Channel | Channel Distance |
|---|---|---|---|---|
| Rx-Short | LRS | CRS | ARS | SRS |
| Tx-Short | LTS | CTS | ATS | STS |
| Tx-Long | LTL | CTL | ATL | STL |
| Rx-Long | LRL | CRL | ARL | SRL |

FIG. 7

| | Location of Antenna | Number of Channels | Number of Array Antennas per Channel | Channel Distance |
|---|---|---|---|---|
| Rx-Short | LRS | CRS=4 | ARS=1 | SRS |
| Tx-Short | LTS | CTS=2 | ATS=1 | STS |
| Tx-Long | LTL | CTL=2 | ATL=6 | STL |
| Rx-Long | LRL | CRL=4 | ARL=4 | SRL |

FIG. 8

| | Location of Antenna | Number of Channels | Number of Array Antennas per Channel | Channel Distance |
|---|---|---|---|---|
| Rx-Short | LRS | CRS≥2 | ARS=1 | SRS=d |
| Tx-Short | LTS | CTS=2 | ATS=1 | STS≥CRS*d |
| Tx-Long | LTL | CTL≥2 | ATL=CRS+2 | STL=2(CRS+2)*d |
| Rx-Long | LRL | CRL≥2 | ARL=2(CRS+2)/(CRL−1) | SRL=2(CRS+2)*d/(CRL−1) |

FIG. 10

| | Vertical Offset | Location of Antenna | Number of Channels | Number of Array Antennas per Channel | Channel Distance |
|---|---|---|---|---|---|
| Rx-Short | X | LRS | CRS=4 | ARS=1 | SRS=d |
| Tx-Short | X | LTS | CTS=2 | ATS=1 | STS≥4d |
| Tx-Long | O | LTL | CTL=2 | ATL=6 | STL=12d |
| Rx-Long | X | LRL | CRL=3 | ARL=6 | SRL=6d |

FIG. 12

| | Vertical Offset | Location of Antenna | Number of Channels | Number of Array Antennas per Channel | Channel Distance |
|---|---|---|---|---|---|
| Rx-Short | X | LRS | CRS=4 | ARS=1 | SRS=d |
| Tx-Short | X | LTS | CTS=2 | ATS=1 | STS≥4d |
| Tx-Long | O | LTL | CTL=2 | ATL=6 | STL=12d |
| Rx-Long | X | LRL | CRL=4 | ARL=4 | SRL=4d |

FIG. 14

| | Vertical Offset | Location of Antenna | Number of Channels | Number of Array Antennas per Channel | Channel Distance |
|---|---|---|---|---|---|
| Rx-Short | X | LRS | CRS=4 | ARS=1 | SRS=d |
| Tx-Short | X | LTS | CTS=2 | ATS=1 | STS≥4d |
| Tx-Long | O | LTL | CTL=2 | ATL=6 | STL=12d |
| Rx-Long | X | LRL | CRL=5 | ARL=3 | SRL=3d |

FIG.16

| | Vertical Offset | Location of Antenna | Number of Channels | Number of Array Antennas per Channel | Channel Distance |
|---|---|---|---|---|---|
| Rx-Short | X | LRS | CRS=4 | ARS=1 | SRS=d |
| Tx-Short | X | LTS | CTS=2 | ATS=1 | STS≥4d |
| Tx-Long | O | LTL | CTL=2 | ATL=6 | STL=12d |
| Rx-Long | X | LRL | CRL=7 | ARL=2 | SRL=2d |

FIG.22

| Vertical Offset | Location of Antenna | Number of Channels | Number of Array Antennas per Channel | Channel Distance |
|---|---|---|---|---|
| Rx-Short | X | LRS | CRS=4 | ARS=1 | SRS=d |
| Tx-Short | X | LTS | CTS=2 | ATS=1 | STS≥4d |
| Tx-Long | O | LTL | CTL=2 | <u>ATL=4</u> | STL=12d |

FIG.24

| Vertical Offset | Location of Antenna | Number of Channels | Number of Array Antennas per Channel | Channel Distance |
|---|---|---|---|---|
| Rx-Short | X | LRS | CRS=4 | ARS=1 | SRS=d |
| Tx-Short | X | LTS | CTS=2 | ATS=1 | STS≥4d |
| Tx-Long | O | LTL | CTL=2 | ATL=8 | STL=14d |

STRUCTURE AND ALIGNMENT METHOD OF ARRAY ANTENNAS FOR VEHICLE RADAR

CROSS REFERENCE TO RELATED APPLICATION

This application claims priority from Korean Patent Application No. 10-2018-0166020, filed on Dec. 20, 2018, which is hereby incorporated by reference for all purposes as if fully set forth herein.

BACKGROUND

Field

Embodiments relate to a structure and alignment method of array antennas for a vehicle radar, the structure and method being able to adjust the locations, number of channels, number of arrays, and channel distance according to the type of antennas, so as to minimize a space occupied by the antennas while maintaining the radiation efficiency of the antennas.

Description of Related Art

Radar technology refers to a technology for detecting an object and obtaining information regarding the object by transmitting a signal by a transmission antenna and receiving an incoming signal generated by the reflection of the transmission signal from the object. Such a radar technology is used in a wide range of applications, such as vehicles, aircrafts, and military applications. Recently, the range of application of the radar technology used in vehicles is gradually increasing. In particular, the development of compact vehicle radars applicable to advanced driver assistance systems (ADAS) has been undertaken. However, as the sizes of vehicle radars are decreasing, an antenna of the radar should be disposed in a limited space. As a result, a problem of output efficiency of an antenna may occur, and signal interferes may occur due to the limited space.

In particular, a vehicle radar includes a long range antenna for detecting long distance objects and a short range antenna for detecting short distance objects. Since the long range antenna and the short range antenna are designed to use signals having the same polarization characteristic for the convenience of designing and verification, a radar structure able to minimize a space occupied by the antennas of the vehicle radar while maintaining the performance of the vehicle radar is demanded.

BRIEF SUMMARY

Various aspects provide a structure and an alignment method of an array antenna for a vehicle radar, the structure and method being able to minimize a space occupied by the antennas while maintaining the radiation efficiency of the antennas.

According to an aspect, an array antenna structure for a vehicle radar may include: a short range receiver antenna; a short range transmitter antenna split into sections disposed to left and right of outside of the short range receiver antenna, respectively; a long range transmitter antenna split into sections disposed to left and right of outside of the short range transmitter antenna, respectively; and a long range receiver antenna disposed to left of the left section of the long range transmitter antenna or to right of the right section of the long range transmitter antenna.

According to another aspect, an array antenna alignment method for a vehicle radar may include: determining the number of channels, the number of array antennas per channel, and the channel distance according to types of the short range receiver antenna, the short range transmitter antenna, the long range transmitter antenna, and the long range receiver antenna; disposing the short range receiver antenna; disposing split sections of the short range transmitter antenna to left and right of outside of the short range receiver antenna, respectively; disposing split sections of the long range transmitter antenna to left and right of outside of the short range transmitter antenna, respectively; and disposing the long range receiver antenna on a side periphery of an entire antenna array.

According to exemplary embodiments, an efficient array antenna structure able to minimize the area of array antennas for a vehicle while maintaining the detection ability of the array antennas can be provided even in a case in which conditions regarding the location of the array antennas and the number of channels are changed within designated ranges.

DESCRIPTION OF DRAWINGS

The above and other objects, features, and advantages of the present disclosure will be more clearly understood from the following detailed description, taken in conjunction with the accompanying drawings, in which:

FIG. 3 is a diagram illustrating parameters related to an array antenna structure for a vehicle radar according to embodiments, the array antenna structure being determined on the basis of the parameters;

FIG. 7 is a diagram illustrating parameters related to the array antenna structure for a vehicle radar according to embodiments, the parameters corresponding to the array antenna structure illustrated in FIG. 6;

FIG. 8 is a diagram illustrating specific conditions regarding the array antenna structure for a vehicle radar according to embodiments, in which the array antenna structure is selectable on the basis of the primary parameter 와 secondary parameter;

FIGS. 9 to 16 are diagrams illustrating the array antenna structure for a vehicle radar according to embodiments, representing alignment conditions of array antennas for a vehicle radar in which locations of four array antennas are fixed, and the long range receiver antenna has different numbers of channels, i.e. 3, 4, 5, and 7 channels;

FIGS. 21 and 22 are diagrams illustrating an array antenna structure and specific conditions thereof in a case in which the channel distance of the long range transmitter antenna does not satisfy the parameter conditions of the array antenna structure for a vehicle radar according to the present disclosure; and FIGS. 23 and 24 are diagrams illustrating an array antenna structure and specific conditions thereof in a case in which the channel distance of the long range transmitter antenna does not satisfy the parameter conditions of the array antenna structure for a vehicle radar according to the present disclosure.

DETAILED DESCRIPTION

Figure 1:
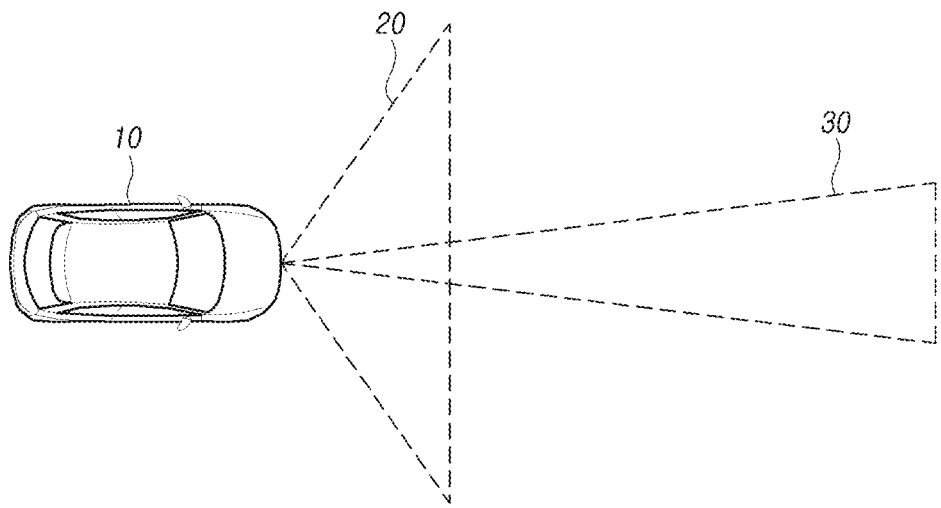
FIG. 1 is a top view illustrating detection zones of a vehicle radar, for detecting long and short distance objects.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a top view illustrating detection zones of a vehicle radar for detecting long and short distance objects. Referring to FIG. 1, a vehicle radar may be disposed on a variety of locations, such as a front portion, a rear portion, or a side portion, of a vehicle 10. In FIG. 1, the vehicle radar illustrated as being disposed on the front portion of the vehicle, as an example.

The vehicle radar includes a long range antenna for detecting long distance objects and a short range antenna for detecting short distance objects. Here, the short range antenna has a wide detection zone 20 in the horizontal direction, due to a wide field of view (FOV) thereof, so as to detect short distance objects. In contrast, the long range antenna has a detection zone 30 having a narrow FOV to detect long distance objects. Thus, the long range antenna has a narrow detection zone in the horizontal direction while being able to detect long distance objects. In this regard, the vehicle 10 may detect long distance objects using the detection zone 30 of the long range antenna and detect short distance objects using the detection zone 20 of the short range antenna. The two types of detection zones are necessary since both a situation in which objects located at long distances from the vehicle 10 are to be detected and a situation in which objects located at short distances from the vehicle are to be detected are required. For example, a long range antenna having a narrow detection zone is necessary for a host vehicle to overtake a preceding vehicle. A short range antenna having a wide detection zone is necessary to prevent collision with pedestrians or other vehicles close to the host vehicle.

Figure 2:
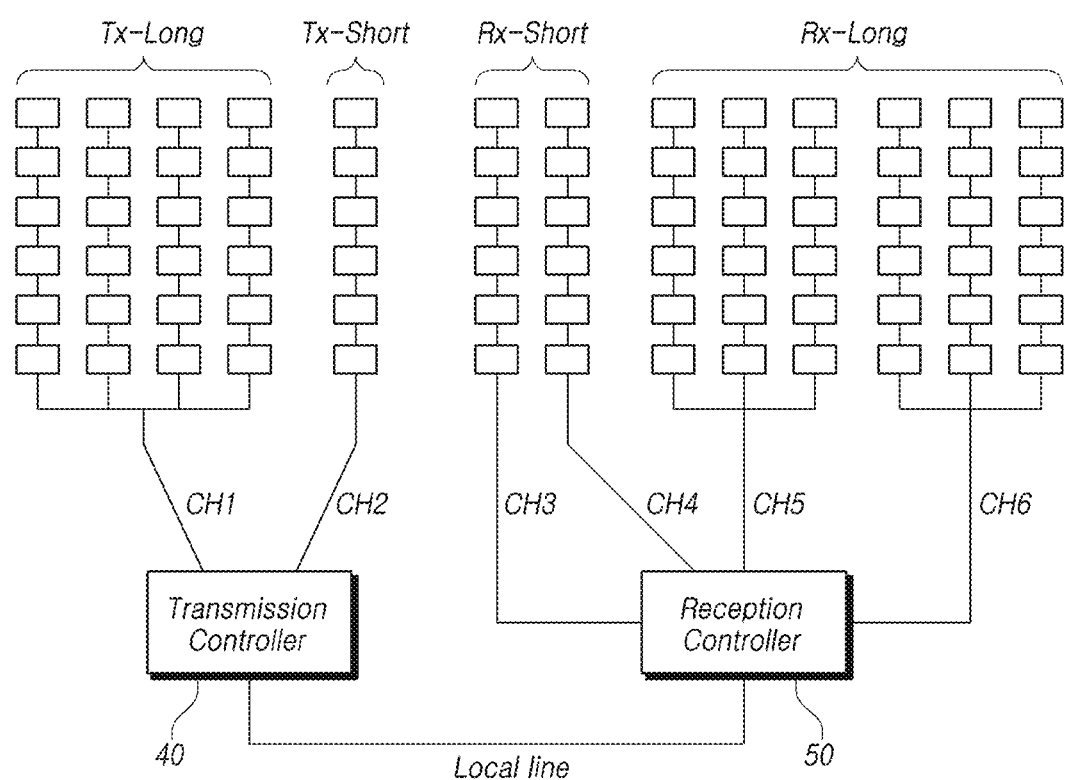
FIG. 2 is a plan view illustrating a structure of a vehicle radar including a long range antenna and a short range antenna.

FIG. 2 illustrates a structure of a vehicle radar including a long range antenna and a short range antenna.

Referring to FIG. 2, a vehicle radar may include a long range antenna and a short range antenna. The long range antenna includes a long range transmitter antenna Tx-Long transmitting long range signals and a long range receiver antenna Rx-Long receiving long range signals. The short range antenna includes a short range transmitter antenna Tx-Short transmission short range signals and a short range receiver antenna Rx-Short receiving short range signals. Here, each of the long range transmitter antenna Tx-Long, the long range receiver antenna Rx-Long, the short range transmitter antenna Tx-Short, and the short range receiver antenna Rx-Short is comprised of one or more patch antennas. An antenna assembly in which two or more patch antennas are connected in a direction perpendicular to the ground surface to properly restrain the directivity of an antenna signal in the vertical direction is referred to as an array antenna. Here, each array antenna will be described as being comprised of six patch antennas, as an example.

The vehicle radar includes a transmission controller 40 to control transmission signals of the long range transmitter antenna Tx-Long and the short range transmitter antenna Tx-Short and a reception controller 50 to control reception signals of the long range receiver antenna Rx-Long and the short range receiver antenna Rx-Short. The transmission controller 40 and the reception controller 50 are connected via a local line. The transmission controller 40 may transmit information regarding transmission signals to the reception controller 50 via the local line, and the reception controller may detect signals from objects using the information regarding transmission signals. For example, the reception controller 50 may detect a signal related to an object by correlation analysis on a signal received using the long range receiver antenna Rx-Long or the short range receiver antenna Rx-Short and the information regarding transmission signals transferred from the transmission controller 40.

To properly restrain the directivity of an antenna signal with respect to a horizontal direction, two or more array antennas are disposed to be parallel to the ground surface at equal distances. Here, the array antennas to which power is supplied through a single feeding line are regarded as being connected to a single channel. For example, four array antennas connected to channel CH1 may constitute the long range transmitter antenna Tx-Long, while a single array antenna connected to channel 2 CH2 may constitute the short range transmitter antenna Tx-Short. In addition, a single array antenna connected to channel 3 CH3 and a single array antenna connected to channel 4 CH4 may constitute the short range receiver antenna Rx-Short, while three array antennas connected to channel 5 CH5 and three array antennas connected to channel 6 CH6 may constitute the long range receiver antenna Rx-Long. Although an array antenna may be connected to a single channel instead of being repeatedly disposed, it is necessary to efficiently adjust the number of array antennas for a channel, since the number of channels used in the constitution of the vehicle radar is limited to be a small number.

In addition, to improve the horizontal resolution, it is necessary to provide a receiver antenna such that the distance between the left end and the right end of the receiver antenna in entire channels is significantly long. In this regard, it may be necessary to increase the number of channels of the receiver antenna or sufficiently increase the distance between array antennas. However, if the distance between array antennas is wider than a half wavelength $\lambda/2$ used, the directivity of a signal may be affected. Therefore, it is necessary to efficiently adjust the number of channels, the number of array antennas, and the distances of array antennas.

FIG. 3 is a diagram illustrating parameters related to an array antenna structure for a vehicle radar according to embodiments, the array antenna structure being determined on the basis of the parameters.

Referring to FIG. 3, the array antenna structure sets correlations between the location LTL of the long range transmitter antenna Tx-Long, the location LRL of the long range receiver antenna Rx-Long, the location LTS of the short range transmitter antenna Tx-Short, and the location LRS of the short range receiver antenna Rx-Short to be primary parameters. If the location LTL of the long range transmitter antenna Tx-Long, the location LRL of the long range receiver antenna Rx-Long, the location LTS of the short range transmitter antenna Tx-Short, and the location LRS of the short range receiver antenna Rx-Short are determined, the array antenna structure may be determined using the number of channels of each antenna, the number of array antennas per channel, and channel distances as secondary parameters.

That is, the location LRS of the short range receiver antenna Rx-Short is determined by the correlation with the other antennas, and the number CRS of channels included inside of the short range receiver antenna Rx-Short, the number ARS of array antennas connected to each channel, and the channel distance SRS is determined. In addition, the location LTS of the short range transmitter antenna Tx-Short is determined by the correlation with the other antennas, and the number CTS of channels included in the short range transmitter antenna Tx-Short, the number ATS of array antennas connected to each channel, and the channel distance STS are determined. In addition, the location LTL of the long range transmitter antenna Tx-Long is determined by the correlation with the other antennas, and the number CTL of channels included in the long range transmitter antenna Tx-Long, the number ATL of array antennas connected to each channel, and the channel distance STL are determined. In addition, the location LRL of the long range receiver antenna Rx-Long is determined by the correlation with the other antennas, and the number CRL of channels included inside of the long range receiver antenna Rx-Long, the number ARL of array antennas connected to each channel, and the channel distance SRL are determined.

Figure 4:
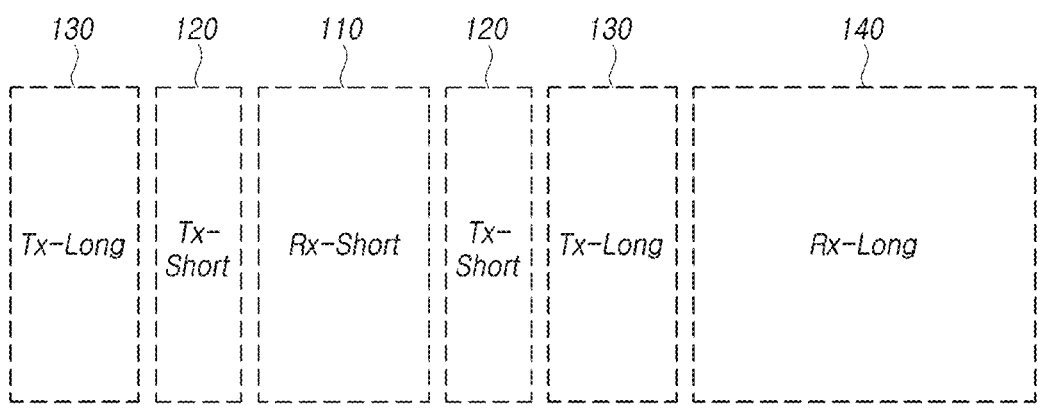
FIG. 4 is a diagram illustrating the positional relationship between antennas as primary parameters in the array antenna structure for a vehicle radar according to embodiments.

FIG. 4 is a diagram illustrating the positional relationship between antennas as the primary parameters in the array antenna structure for a vehicle radar according to embodiments.

Referring to FIG. 4, the array antenna structure for a vehicle radar according to embodiments includes four types of antennas, i.e. a short range receiver antenna Rx-Short 110, a short range transmitter antenna Tx-Short 120, a long range transmitter antenna Tx-Long 130, and a long range receiver antenna Rx-Long 140.

The short range transmitter antenna Tx-Short 120 is split into two antennas disposed to the left and the right of the outside of the short range receiver antenna Rx-Short 110. That is, the short range transmitter antenna Tx-Short 120 is split into the two antennas disposed to the left and the right of the short range receiver antenna Rx-Short 110.

The long range transmitter antenna Tx-Long 130 is split into two antennas disposed to the left and the right of the outside of the short range transmitter antenna Tx-Short 120. That is, the long range transmitter antenna Tx-Long 130 is split into two antennas disposed to the left and the right of the short range transmitter antenna Tx-Short 120.

Figure 5:
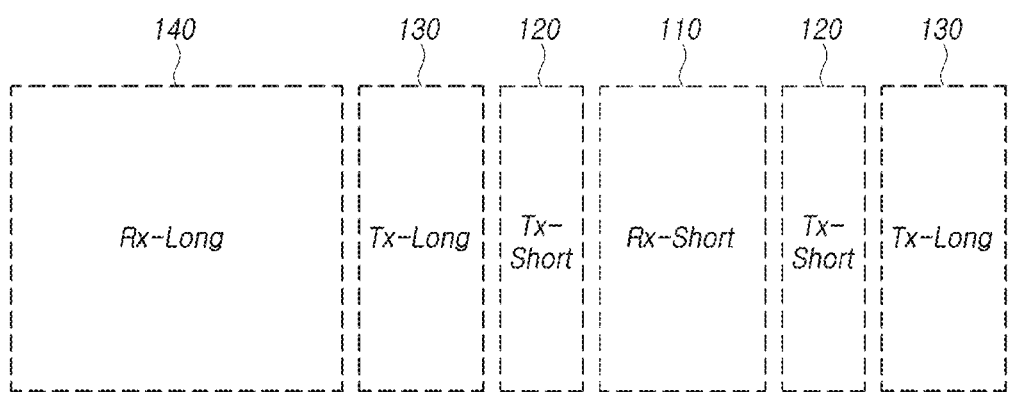
FIG. 5 is a diagram illustrating the array antenna structure for vehicle radar according to embodiments, in which the long range receiver antenna is disposed in the leftmost location of the entire array.

The long range receiver antenna Rx-Long 140 is provided as a non-split integral structure, and is disposed to a side of the long range transmitter antenna Tx-Long 130. The long range receiver antenna Rx-Long 140 may be disposed to the left of the left of the outside of the long range transmitter antenna Tx-Long 130, or may be disposed to the right of the right long range transmitter antenna Tx-Long 130. FIG. 4 illustrates a case in which the long range receiver antenna Rx-Long 140 is disposed to the right of the right long range transmitter antenna Tx-Long 130, i.e. disposed in the rightmost location of the entire array, while FIG. 5 illustrates a case in which the long range receiver antenna Rx-Long 140 is disposed to the left of the left long range transmitter antenna Tx-Long 130, i.e. disposed in the leftmost location of the entire array.

Describing the efficiency of antenna signals regarding this array, the short range receiver antenna Rx-Short 110 and the long range receiver antenna Rx-Long 140 corresponding to receiver antennas may be provided as an integral structure concentrated in a specific space to improve the reception efficiency of antenna signals. In addition, as the transmitter antennas, i.e. the short range transmitter antenna Tx-Short 120 and the long range transmitter antenna Tx-Long 130, are disposed in the split structure, the transmission range of antenna signals may be increased.

In addition, the efficiency of the area occupied by the array antennas for a vehicle radar will be described as follows. In the array antennas for a vehicle radar, if the width in the horizontal direction in which the respective patch antennas are aligned increases, radiation patterns of the patch antennas are combined with each other, thereby producing a narrow radar signal pattern. As a result, the detection zone in the horizontal direction is narrow, but the detection distance is increased. Accordingly, the long range transmitter antenna Tx-Long 130 and the long range receiver antenna Rx-Long 140 are aligned in a relatively wide width in the horizontal direction, whereas the short range receiver antenna Rx-Short 110 and the short range transmitter antenna Tx-Short 120 may be aligned in a relatively narrow width in the horizontal direction. Accordingly, the short range receiver antenna Rx-Short 110 and the short range transmitter antenna Tx-Short 120 having a relatively narrow alignment in the horizontal direction may be disposed on the central portion and the long range transmitter antenna Tx-Long 130 and the long range receiver antenna Rx-Long 140 having a relatively wide width in the horizontal direction may be disposed on both sides of the central portion, so that the area of the array antennas in a vehicle radar is minimized.

Hereinafter, in the array antenna structure for a vehicle radar according to the present disclosure, the number of channels, the number of array antennas per channel, and the channel distance corresponding to the secondary parameters, in addition to the primary parameters based on the positional relationship between the antennas, will be described in detail. Here, the short range transmitter antenna Tx-Short and the long range transmitter antenna Tx-Long may have two or more channels to minimize the size of the vehicle radar and compensate for the relatively small number of channels of the reception antennas. In addition, the short range transmitter antenna Tx-Short and the short range receiver antenna Rx-Short may be assigned with one (1) array antenna per channel to produce relatively wide signal patterns of the short range transmitter antenna Tx-Short and the short range receiver antenna Rx-Short.

Figure 6:
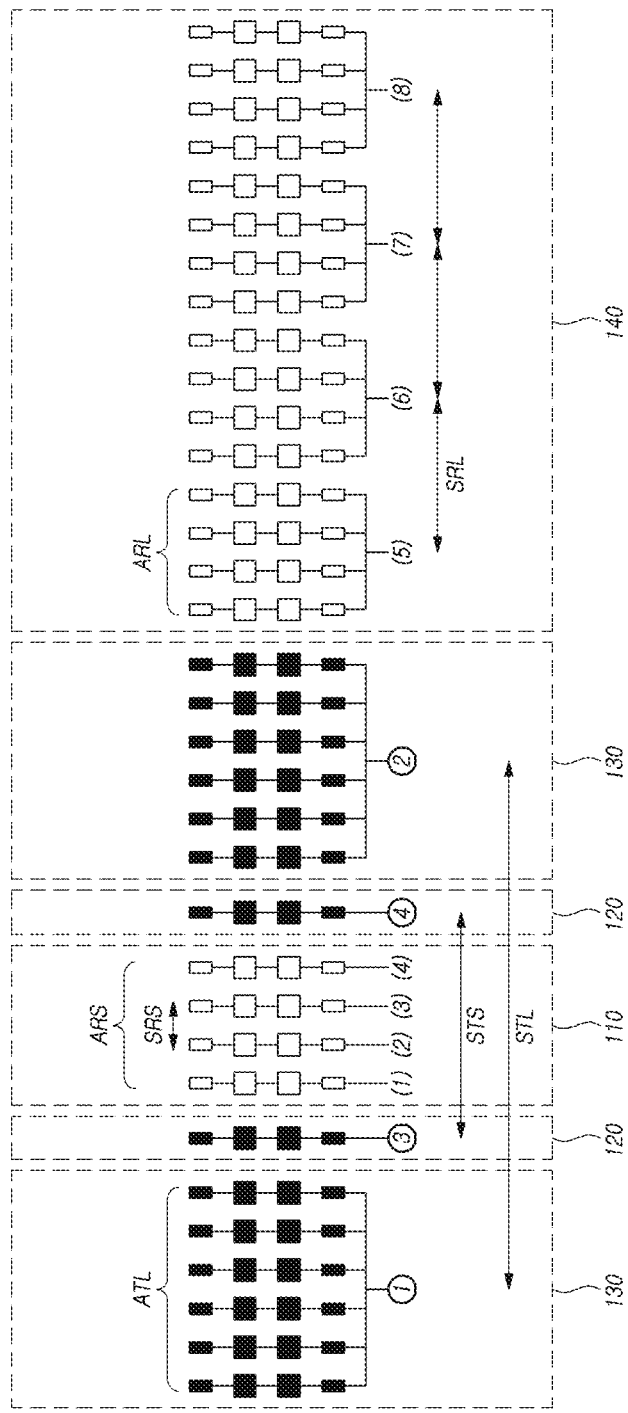
FIG. 6 is a diagram illustrating the array antenna structure for a vehicle radar according to embodiments, in which the array antenna structure is configured in consideration of the positional relationship between the antennas, corresponding to the primary parameters, and secondary the parameters.

FIG. 6 is a diagram illustrating the array antenna structure for a vehicle radar according to embodiments, in which the array antenna structure is configured in consideration of the positional relationship between the antennas, corresponding to the primary parameters, and secondary the parameters.

Referring to FIG. 6, in the array antenna structure for a vehicle radar according to the present disclosure, the short range receiver antenna Rx-Short 110 is provided as an integral structure which is not split, and the short range transmitter antenna Tx-Short 120 is split into two sections disposed on both sides of the short range receiver antenna Rx-Short 110. In addition, the long range transmitter antenna Tx-Long 130 is split to be disposed on the left and right of the outside of the short range transmitter antenna Tx-Short 120, and the long range receiver antenna Rx-Long 140 is provided as a non-split integral structure to be disposed to a side of the outside of the long range transmitter antenna Tx-Long 130.

Here, the short range receiver antenna Rx-Short 110 may be comprised of a plurality of channels, each of which may be provided as a single array antenna. The short range receiver antenna Rx-Short 110 is illustrated as being comprised of four channels (1) to (4), as an example.

The short range transmitter antenna Tx-Short 120 is disposed to the left and the right of the outside of the short range receiver antenna Rx-Short 110. A single channel ③ comprised of a single array antenna may be disposed to the left of the short range receiver antenna Rx-Short 110, and a single channel ④ comprised of a single array antenna may be disposed on the right of the short range receiver antenna Rx-Short 110.

The long range transmitter antenna Tx-Long 130 is split to be disposed on both sides of the short range transmitter antenna Tx-Short 120. A single channel ① may be disposed to the left of the short range transmitter antenna Tx-Short 120, and a single channel ② may be disposed to the right of the short range transmitter antenna Tx-Short 120. Here, each of the channels ① and ② of the long range transmitter antenna Tx-Long 130 may be comprised of a plurality of array antennas. A case in which each channel is comprised of six array antennas is illustrated as an example.

The long range receiver antenna Rx-Long 140 may be provided as a non-split integral structure to be disposed to a side of the long range transmitter antenna Tx-Long 130, i.e. disposed in the leftmost or rightmost location of the entire array. Here, a case in which the long range receiver antenna Rx-Long 140 is disposed on the right periphery of the entire array is illustrated as an example. The long range receiver antenna Rx-Long 140 may be comprised of a plurality of channels, for example, four channels (4) to (8), in each of which four array antennas are disposed.

Accordingly, the receiver antennas, including the short range receiver antenna Rx-Short 110 and the long range receiver antenna Rx-Long 140, may have eight channels (1) to (8), while the transmitter antennas, including the short range transmitter antenna Tx-Short 120 and the long range transmitter antenna Tx-Long 130, may have four antennas ① to ④.

Here, it is efficient to set the distance between the channels on the basis of the short range receiver antenna Rx-Short 110 in which a single array antenna is disposed for a single channel. Accordingly, the channel distance SRS of the short range receiver antenna Rx-Short 110 may be equally maintained to be a reference distance d, and the channel distances STS, STL, and SRL of the other antennas 120, 130, and 140 may be indicated using the reference distance d.

In addition, the channel distance SRS of the short range receiver antenna Rx-Short 110 may be determined to be a predetermined specific distance and a distance set as a multiple of the specific distance. For example, the channel distance SRS of the short range receiver antenna Rx-Short 110 may be comprised of (1) and (2) such that the reference distance d is provided, (2) and (3) such that a distance 2$d$ is provided, and (3) and (4) such that the reference distance d is provided. This is merely an example, and in a case in which two or more short range receiver antennas Rx-Short 110 are provided at the reference distance, there is no limitation.

In addition, the array antennas are illustrated as being respectively comprised of four patch antennas, as an example, and it is apparent that the number of patch antennas may be variously changed, depending on the purpose of detection.

FIG. 7 is a diagram illustrating parameters related to the array antenna structure for a vehicle radar according to embodiments, the parameters corresponding to the array antenna structure illustrated in FIG. 6.

That is, in a situation in which the locations of four types of antennas corresponding to the primary parameters are determined, if the number CRS of channels of the short range receiver antenna Rx-Short 110 is determined to be 4, the number CTS of channels of the short range transmitter antenna Tx-Short 120 is determined to be 2, the number CTL of channels of the long range transmitter antenna Tx-Long 130 is determined to be 2, and the number CRL of channels of the long range receiver antenna Rx-Long 140 is determined to be 4, the number of array antennas per channel may be determined. The number of array antennas per channel of the short range receiver antenna Rx-Short 110 may be determined to be 1, the number of array antennas per channel of the short range transmitter antenna Tx-Short 120 may be determined to be 1, the number of array antennas per channel of the long range transmitter antenna Tx-Long 130 may be determined to be 6, and the number of array antennas per channel of the long range receiver antenna Rx-Long 140 may be determined to be 4. Here, regarding the channel distance, the channel distance SRS of the short range receiver antenna Rx-Short 110 may be set to be the reference distance d. In addition, the channel distance STS of the short range transmitter antenna Tx-Short 120, the channel distance STL of the long range transmitter antenna Tx-Long 130, and the channel distance SRL of the long range receiver antenna Rx-Long 140 may be indicated using the reference distance d.

FIG. 8 is a diagram illustrating specific conditions regarding the array antenna structure for a vehicle radar according to embodiments, in which the array antenna structure is selectable on the basis of the primary parameter 와 secondary parameter.

Referring to FIG. 8, in the array antenna structure for a vehicle radar according to the present disclosure, the locations of four types of antennas corresponding to the primary parameters are equally applied. That is, the short range receiver antenna Rx-Short 110 is provided as a non-split integral structure, the short range transmitter antenna Tx-Short 120 is split to be disposed on both sides of the short range receiver antenna Rx-Short 110, the long range transmitter antenna Tx-Long 130 is split to be disposed to the left and the right of the short range transmitter antenna Tx-Short 120, and the long range receiver antenna Rx-Long 140 is provided as a non-split integral structure to be disposed in the outermost location of the left or right side of the entire antenna array.

The short range receiver antenna Rx-Short 110 is comprised of a plurality of channels, each of which is provided as a single array antenna. Here, the distance between the channels of the short range receiver antenna Rx-Short 110 is equally set to be the reference distance d.

The short range transmitter antenna Tx-Short 120 is disposed on both sides of the short range receiver antenna Rx-Short 110, such that single channels are disposed on both sides of the short range receiver antenna Rx-Short 110, respectively. Each channel is provided as a single array antenna. Since the short range transmitter antenna Tx-Short 120 is disposed on both sides of the short range receiver antenna Rx-Short 110, the channel distance STS of the short range transmitter antenna Tx-Short 120 may be greater than a value obtained by multiplying the channel distance SRS=d of the short range receiver antenna Rx-Short 110 with the number CRS of channels of the short range receiver antenna Rx-Short 110.

The long range transmitter antenna Tx-Long 130 is comprised of a plurality of channels, and is split to be disposed to the left and right of the outside of the short range transmitter antenna Tx-Short 120. The number ATL of array antennas per channel of the long range transmitter antenna Tx-Long 130 is a plural number. The number ATL of the array antennas per channel of the long range transmitter antenna Tx-Long 130 may be determined to be proportional to the number CRS of channels of the short range receiver antenna Rx-Short 110. For example, the number ATL of array antennas per channel of the long range transmitter antenna Tx-Long 130 may be determined to be greater than the number CRS of channels of the short range receiver antenna Rx-Short 110 by K. For example, K may be a natural number, such as 2.

Specifically, the number ATL of array antennas per channel of the long range transmitter antenna Tx-Long 130 may be greater than the number CRS of channels of the short range receiver antenna Rx-Short 110. For example, the number ATL of array antennas per channel of the long range transmitter antenna Tx-Long 130 may be CRS+2, which is greater than the number CRS of channels of the short range receiver antenna Rx-Short 110 by 2. Since the long range transmitter antenna Tx-Long 130 is disposed to the left and right of the outside of the short range transmitter antenna Tx-Short 120, the channel distance STL of the long range transmitter antenna Tx-Long 130 may be a value STL=2(CRS+2)*d obtained by multiplying the number ATL=CRS+2 of array antennas per channel of the long range transmitter antenna Tx-Long 130 with two times the channel distance SRS=d of the short range receiver antenna Rx-Short 110.

The long range receiver antenna Rx-Long 140 is provided as a non-split integral structure to be disposed on the outermost location of the left side or the right side of the entire antenna array. The long range receiver antenna Rx-Long 140 may be comprised of a plurality of channels, in which the number ARL of array antennas per channel may be a value 2(CRS+2)/(CRL−1) obtained by dividing two times the number CRS+2 of array antennas per channel of the long range transmitter antenna Tx-Long 130 with a value CRL−1 smaller than the number CRL of channels of the long range receiver antenna Rx-Long 140 by 1. Here, the channel distance SRL of the long range receiver antenna Rx-Long 140 may be determined to be a value 2(CRS+2)*d/(CRL−1) obtained by dividing the channel distance STL=2(CRS+2)*d with a value CRL−1 smaller than the channel number CRL of the long range receiver antenna Rx-Long 140 by 1.

FIGS. 9 to 16 are diagrams illustrating a plurality of cases in which alignable array antenna structures for a vehicle radar and alignment conditions of the array antenna structures, in accordance with the conditions set in FIG. 8. In particular, the long range transmitter antenna Tx-Long 130 may have an offset causing the vertical height thereof to differ from those of the other antennas 110, 120, and 140 in order to detect objects located in vertical heights. In FIGS. 9 to 16, a condition in which the long range transmitter antenna Tx-Long 130 has a vertical offset is added.

Figure 9:
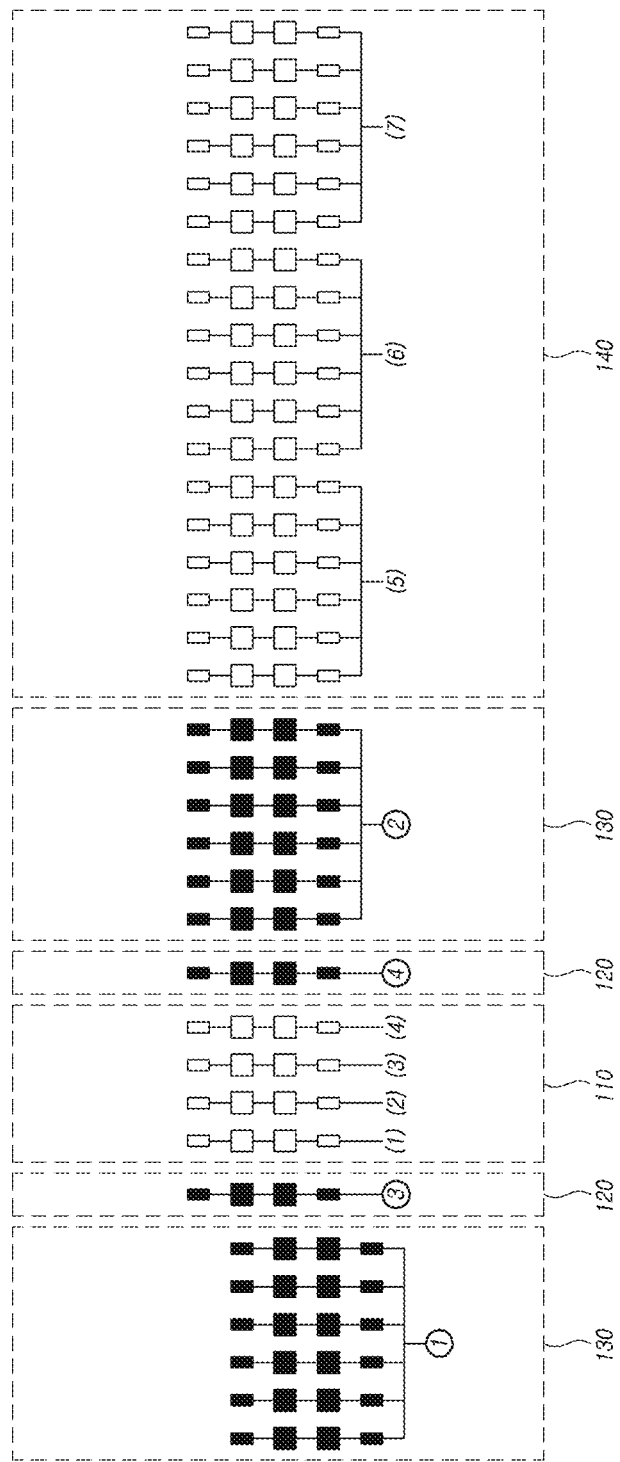
Figure 11:
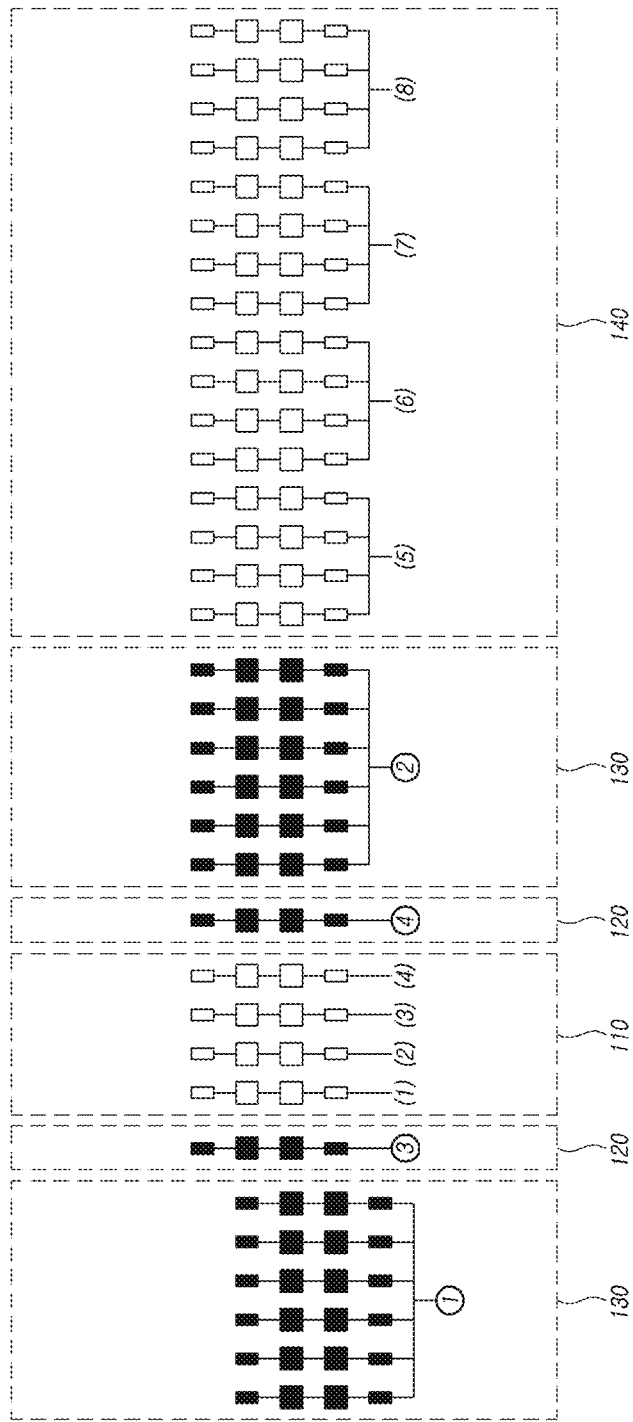
Figure 13:
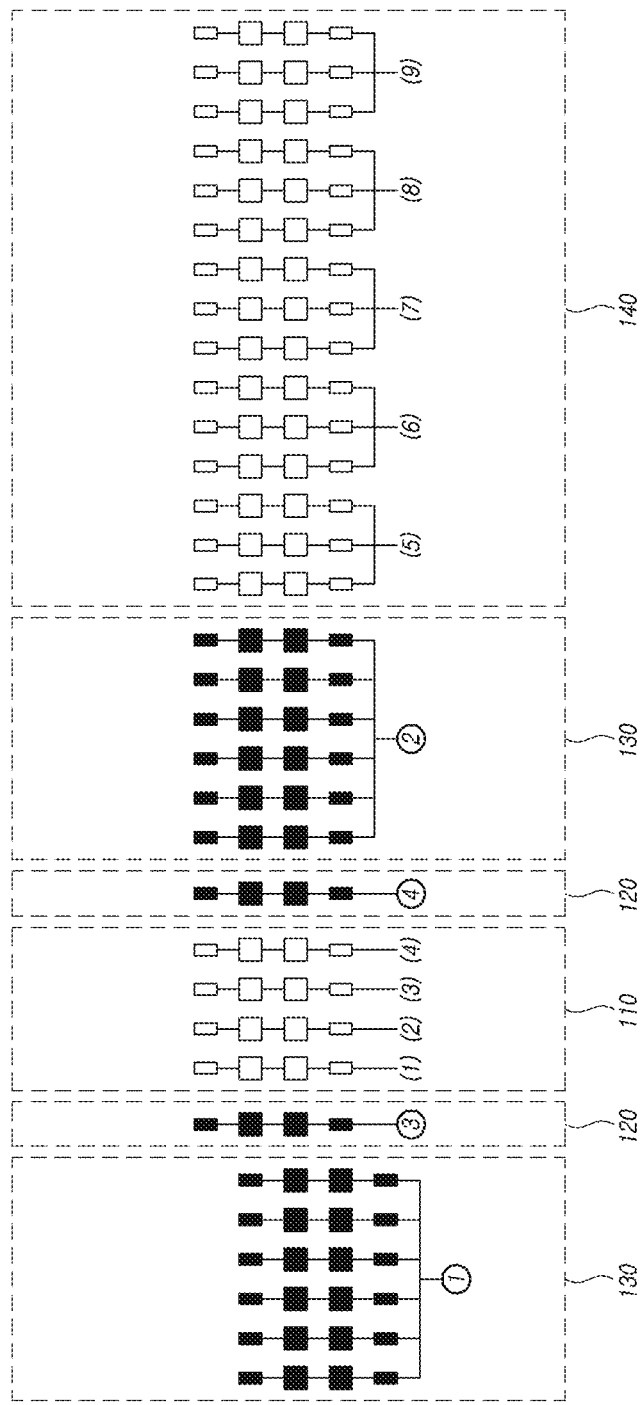
Figure 17:
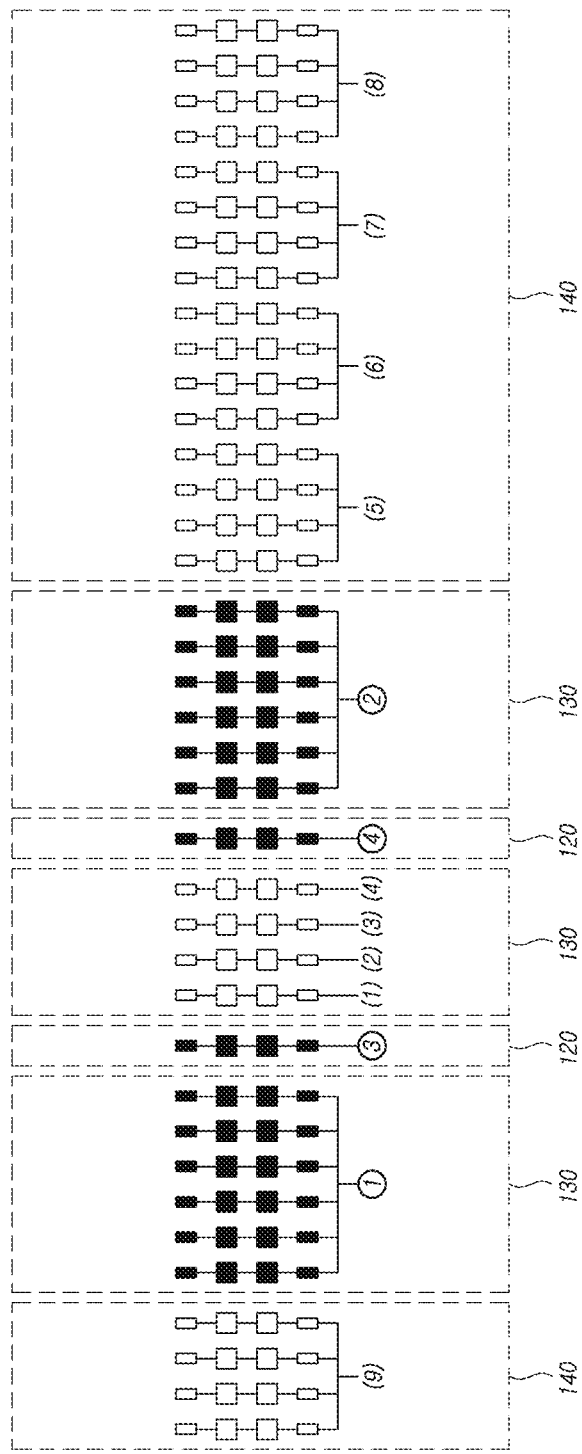
FIG. 17 is a diagram illustrating a case in which a long range receiver antenna is further disposed in a situation in which array antennas for a vehicle radar are disposed in accordance with the conditions set in FIG. 8.

In the same manner, the long range receiver antenna Rx-Long 140 may also have an offset causing the vertical height thereof to differ from those of the other antennas 110, 120, and 130 in order to detect objects located in vertical heights. For example, in a case in which the long range receiver antenna Rx-Long 140 is comprised of a plurality of channels, only the long range receiver antenna Rx-Long 140 constituting one channel among the plurality of channels, located closest to or farthest from the long range transmitter antenna Tx-Long 130, may have a vertical offset. Referring to FIG. 9, only channel (5) or channel (7) may have a vertical offset. Referring to FIG. 11, only channel (5) or channel (8) may have a vertical offset. Referring to FIG. 13, only channel (5) or channel (9) may have a vertical offset. Likewise, referring to FIG. 15, only channel (5) or channel (7) may have a vertical offset. Referring to FIG. 17, only channel (5) or channel (8) may have a vertical offset.

Both the long range transmitter antenna Tx-Long 130 and the long range receiver antenna Rx-Long 140 may have vertical offsets. Although a case in which the long range transmitter antenna Tx-Long 130 has a vertical offset will be described hereinafter with reference to FIGS. 9 to 16, the same may be applied to a case in which the long range receiver antenna Rx-Long 140 has a vertical offset.

FIGS. 9 to 16 illustrate cases in which the long range receiver antenna Rx-Long 140 has different numbers CRL of channels, i.e. 3, 4, 5, and 7 channels, while the other conditions are the same.

Therefore, as illustrated in FIGS. 9 and 10, the locations of the antennas corresponding to the primary parameters are equally applied. In addition, the number CRS of channels of the short range receiver antenna Rx-Short 110 is set to be 4, the number CTS of channels of the short range transmitter antenna Tx-Short 120 is set to be 2, the number CTL of channels of the long range transmitter antenna Tx-Long 130 is set to be 2, and the number CRL of channels of the long range receiver antenna Rx-Long 140 is set to be 3. In this case, the number of array antennas per channel may be 1 for the short range receiver antenna Rx-Short 110, 1 for the short range transmitter antenna Tx-Short 120, 6 for the long range transmitter antenna Tx-Long 130, and 6 for the long range receiver antenna Rx-Long 140. Here, the channel distance d of the short range receiver antenna Rx-Short 110 may be set to be equal, while the channel distance STS of the short range transmitter antenna Tx-Short 120 may be set to be four or more times the channel distance d, the channel distance STL of the long range transmitter antenna Tx-Long 130 may be set to be 12d, i.e. twelve times the channel distance d, and the channel distance SRL of the long range receiver antenna Rx-Long 140 may be set to be 6d, i.e. six times the channel distance d.

FIGS. 11 and 12 are diagrams illustrating an array antenna structure and specific conditions thereof in a case in which the locations of four types of antennas corresponding to the primary parameter are maintained to be the same, while the number CRS of channels of the short range receiver antenna Rx-Short 110 is set to be 4, the number CTS of channels of the short range transmitter antenna Tx-Short 120 is set to be 2, the number CTL of channels of the long range transmitter antenna Tx-Long 130 is set to be 2, and the number CRL of channels of the long range receiver antenna Rx-Long 140 is set to be 4.

In this case, the number of array antennas per channel may be set to be 1 for the short range receiver antenna Rx-Short 110, 1 for the short range transmitter antenna Tx-Short 120, 6 for the long range transmitter antenna Tx-Long 130, and 4 for the long range receiver antenna Rx-Long 140. Therefore, with respect to the same channel distance d of the short range receiver antenna Rx-Short 110, the channel distance STS of the short range transmitter antenna Tx-Short 120 may be set to be four or more times the channel distance d, the channel distance STL of the long range transmitter antenna Tx-Long 130 may be set to be 12d, i.e. twelve times the channel distance d, and the channel distance SRL of the long range receiver antenna Rx-Long 140 may be set to be 4d, i.e. four times the channel distance d.

FIGS. 13 and 14 are diagrams illustrating an array antenna structure and specific conditions thereof in a case in which the locations of four types of antennas corresponding to the primary parameter are maintained to be the same, while the number CRS of channels of the short range receiver antenna Rx-Short 110 is set to be 4, the number CTS of channels of the short range transmitter antenna Tx-Short 120 is set to be 2, and the number CRL of channels of the long range receiver antenna Rx-Long 140 is set to be 5.

In this case, the number of array antennas per channel may be set to be 1 for the short range receiver antenna Rx-Short 110, 1 for the short range transmitter antenna Tx-Short 120, 6 for the long range transmitter antenna Tx-Long 130, and 3 for the long range receiver antenna Rx-Long 140. Therefore, with respect to the channel distance d of the short range receiver antenna Rx-Short 110, the channel distance STS of the short range transmitter antenna Tx-Short 120 may be set to be four or more times the channel distance d, the channel distance STL of the long range transmitter antenna Tx-Long 130 may be set to be 12d, i.e. twelve times the channel distance d, and the channel distance SRL of the long range receiver antenna Rx-Long 140 may be set to be 3d, i.e. three times the channel distance d.

Figure 15:
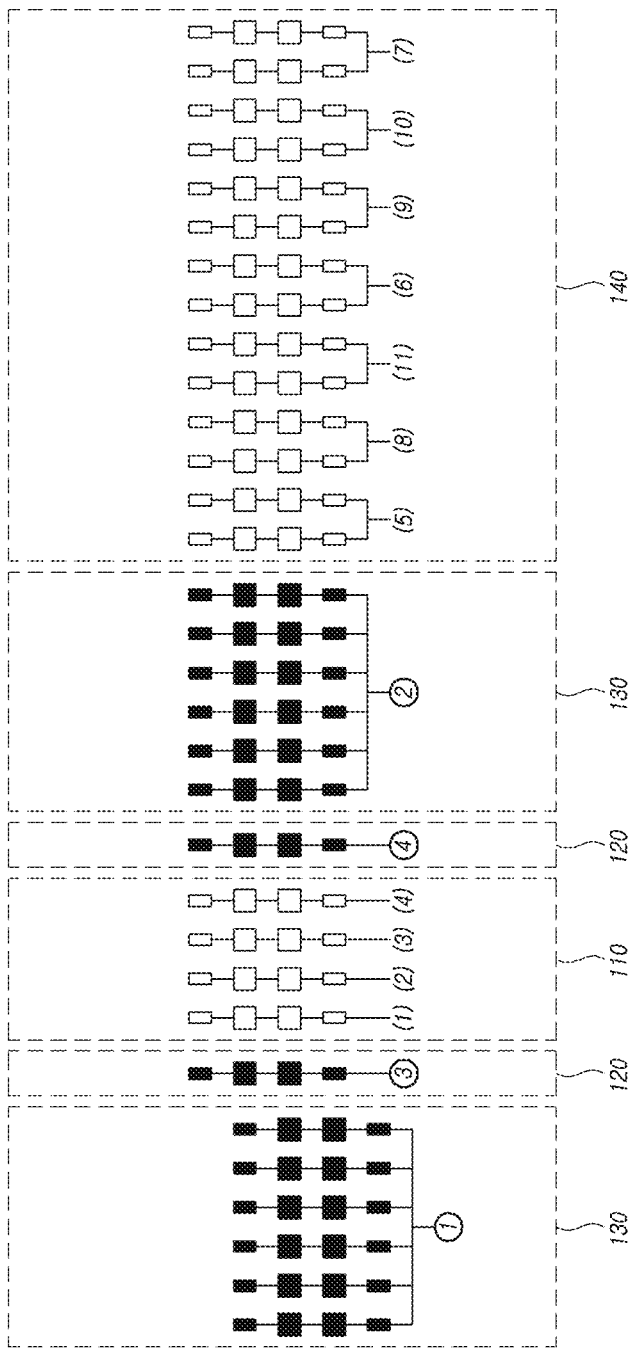

FIGS. 15 and 16 are diagrams illustrating an array antenna structure and specific conditions thereof in a case in which the locations of four types of antennas corresponding to the primary parameter are maintained to be the same, while the number CRS of channels of the short range receiver antenna Rx-Short 110 is set to be 4, the number CTL of channels of the long range transmitter antenna Tx-Long 130 is set to be 2, the number CTL of channels of the long range transmitter antenna Tx-Long 130 is set to be 2, and the number of channels of the long range receiver antenna Rx-Long 140 is set to be 7.

In this case, the number of array antennas per channel may be set to be 1 for the short range receiver antenna Rx-Short 110, 1 for the short range transmitter antenna Tx-Short 120, 6 for the long range transmitter antenna Tx-Long 130, and 2 for the long range receiver antenna Rx-Long 140. Therefore, with respect to the same channel distance d of the short range receiver antenna Rx-Short 110, the channel distance STS of the short range transmitter antenna Tx-Short 120 may be set to be four or more times the channel distance d, the channel distance STL of the long range transmitter antenna Tx-Long 130 may be set to be 12d, i.e. twelve times the channel distance d, and the channel distance SRL of the long range receiver antenna Rx-Long 140 may be set to be 2d, i.e. two times the channel distance d.

As described above, when the number of channels of the short range receiver antenna Rx-Short 110, the long range transmitter antenna Tx-Long 130, or the long range receiver antenna Rx-Long 140 are varied while the locations of the short range receiver antenna Rx-Short 110, the short range transmitter antenna Tx-Short 120, the long range transmitter antenna Tx-Long 130, and the long range receiver antenna Rx-Long 140 corresponding to the primary parameters are maintained to be the same, the number of array antennas per channel and the channel distances of the antennas may be varied. Accordingly, when the locations of the four types of antennas are maintained to be the same as the primary parameters, even in a case in which the number of channels of a specific antenna is changed within a preset range, it is possible to minimize the area occupied by the array antennas for a vehicle radar while maintaining the detection ability of the array antennas, thereby realizing an inexpensive and efficient array antenna structure.

In addition, in a case in which the primary parameters and the other secondary parameters regarding the locations of the antennas are satisfied as described above, the number of patch antennas used in a single array antenna may be variously changed depending on the purpose of detection.

As long as the conditions of the primary parameters and the secondary parameters according to the present disclosure as set forth above are satisfied, additional antennas may further be disposed.

FIG. 17 is a diagram illustrating a case in which a long range receiver antenna Rx-Long 140 is further disposed in a situation in which array antennas for a vehicle radar are disposed in accordance with the conditions set in FIG. 8.

That is, the short range receiver antenna Rx-Short 110 is provided as a non-split integral structure, the short range transmitter antenna Tx-Short 120 is split to be disposed on both sides of the short range receiver antenna Rx-Short 110, the long range transmitter antenna Tx-Long 130 is split to be disposed to the left and the right of the outside of the short range transmitter antenna Tx-Short 120, and the long range receiver antenna Rx-Long 140 is provided as a non-split integral structure to be disposed on the right periphery of the entire antenna array. In addition, the long range receiver antenna Rx-Long 140 having a single channel is additionally disposed on the left periphery of the entire antenna array.

In this case, the conditions of the primary parameters and the secondary parameters according to the present disclosure are satisfied, and thus, the signal performance of the array antennas for a vehicle radar may be efficiently maintained.

Figure 18:
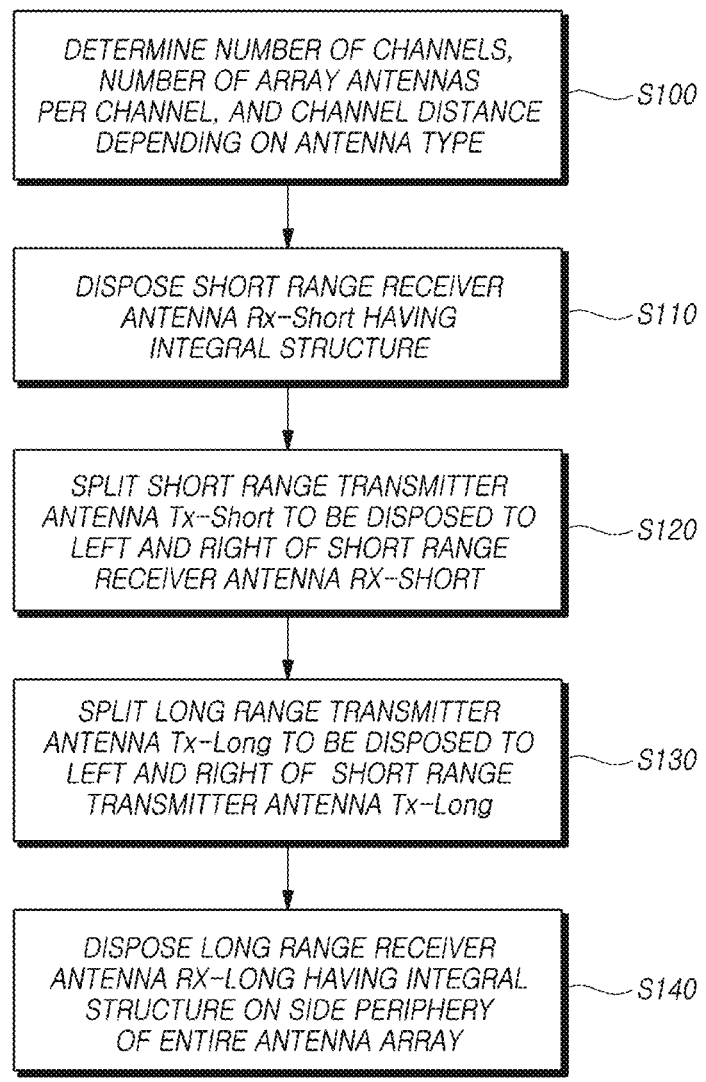
FIG. 18 is a flowchart illustrating an array antenna alignment method for a vehicle radar according to embodiments.

FIG. 18 is a flowchart illustrating an array antenna alignment method for a vehicle radar according to embodiments. To align the array antennas according to the present disclosure on a vehicle radar, the determination of auxiliary conditions including the numbers of channels, the numbers of array antennas per channel, and channel distances according to four types of antennas, i.e. the short range receiver antenna Rx-Short 110, the short range transmitter antenna Tx-Short 120, the long range transmitter antenna Tx-Long 130, and the long range receiver antenna Rx-Long 140, are required to be performed in advance.

In this regard, the array antenna alignment method for a vehicle radar according to embodiments may include: step S100 of determining the number of channels, the number of array antennas per channel, and the channel distance according to the type of antennas; step S110 of disposing the short range receiver antenna Rx-Short having a non-split integral structure; step S120 of splitting the short range transmitter antenna Tx-Short to be disposed to the left and the right of the short range receiver antenna Rx-Short; step S130 of splitting the long range transmitter antenna Tx-Long to be disposed to the left and the right of the outside of the short range transmitter antenna Tx-Short; and step S140 of disposing the long range receiver antenna Rx-Long having a non-split integral structure on a side periphery of the entire antenna array.

The step S100 of determining the number of channels, the number of array antennas per channel, and the channel distance according to the type of antennas is an operation of determining the number of channels, the number of array antennas per channel, and the channel distance according to four types of antennas in accordance with the conditions set in FIG. 8. That is, the number of channels of the short range transmitter antenna Tx-Short 120 may be fixed to be 2, while the number of channels of the remaining antennas, i.e. the short range receiver antenna Rx-Short 110, the long range transmitter antenna Tx-Long 130, and the long range receiver antenna Rx-Long 140, may be set to be 2 or more. In addition, the number of array antennas per channel may be fixed to be 1 for the short range receiver antenna Rx-Short 110 and for the short range transmitter antenna Tx-Short 120. For the long range transmitter antenna Tx-Long 130, the number of array antennas per channel may be set to be greater than the number CRS of channels of the short range receiver antenna Rx-Short 110 by 2 or more. For the long range receiver antenna Rx-Long 140, the number of array antennas per channel may be set to be a value 2(CRS+2)/(CRL−1) obtained by dividing two times the number CRS+2 of array antennas per channel of the long range transmitter antenna Tx-Long 130 with a value CRL−1 smaller than the number CRL of channels of the long range receiver antenna Rx-Long 140 by 1. In addition, the channel distance SRS of the short range receiver antenna Rx-Short 110 may be set to be the reference distance d, and the channel distance STS of the short range transmitter antenna Tx-Short 120 may be set to be greater than a value obtained by multiplying the channel distance SRS=d of the short range receiver antenna Rx-Short 110 with the number CRS of channels of the short range receiver antenna Rx-Short 110. In addition, the channel distance STL of the long range transmitter antenna Tx-Long 130 may be set to be a value obtained by multiplying the number CRS+2 of array antennas per channel of the long range transmitter antenna Tx-Long 130 with two times the channel distance SRS=d of the short range receiver antenna Rx-Short 110. The channel distance SRL of the long range receiver antenna Rx-Long 140 may be set to be a value obtained by dividing the channel distance STL=2(CRS+2)*d with a value smaller than the channel number CRL of the long range receiver antenna Rx-Long 140 by 1.

After the number of channels, the number of array antennas per channel, and the channel distance according to the type of antenna are determined, the step S110 of disposing the short range receiver antenna Rx-Short having a non-split integral structure is performed. Thus, any antenna having a different type is not disposed inside of the short range receiver antenna Rx-Short 110.

The step S120 of splitting the short range transmitter antenna Tx-Short to be disposed to the left and the right of the short range receiver antenna Rx-Short is an operation of splitting the short range transmitter antenna Tx-Short into two channels respectively including a single array antenna and disposing the split channels to the left and the right of the outside of the short range receiver antenna Rx-Short 110, respectively.

The step S130 of splitting the long range transmitter antenna Tx-Long to be disposed to the left and the right of the outside of the short range transmitter antenna Tx-Short is an operation of splitting the long range transmitter antenna Tx-Long into two channels respectively including a plurality of array antennas and disposing the split channels to the left and the right of the outside of the short range receiver antenna Rx-Short 110, respectively.

The step S140 of disposing the long range receiver antenna Rx-Long having a non-split integral structure on a side periphery of the entire antenna array is an operation of the long range receiver antenna Rx-Long 140 to the left of the left long range transmitter antenna Tx-Long 130 or to the right of the right long range transmitter antenna Tx-Long 130, so that the long range transmitter antenna Tx-Long 130 is disposed on the left or right periphery of the entire antenna structure.

After the auxiliary conditions including the numbers of channels, the numbers of array antennas per channel, and channel distances according to four types of antennas, i.e. the short range receiver antenna Rx-Short 110, the short range transmitter antenna Tx-Short 120, the long range transmitter antenna Tx-Long 130, and the long range receiver antenna Rx-Long 140, are determined as described above, the four types of antennas may be disposed in corresponding positions in accordance with basic conditions. Accordingly, the array antennas for a vehicle radar may be aligned in such a manner in which a space occupied by the antennas is minimized and the radiation efficiency of the antennas is maintained.

Figure 19:
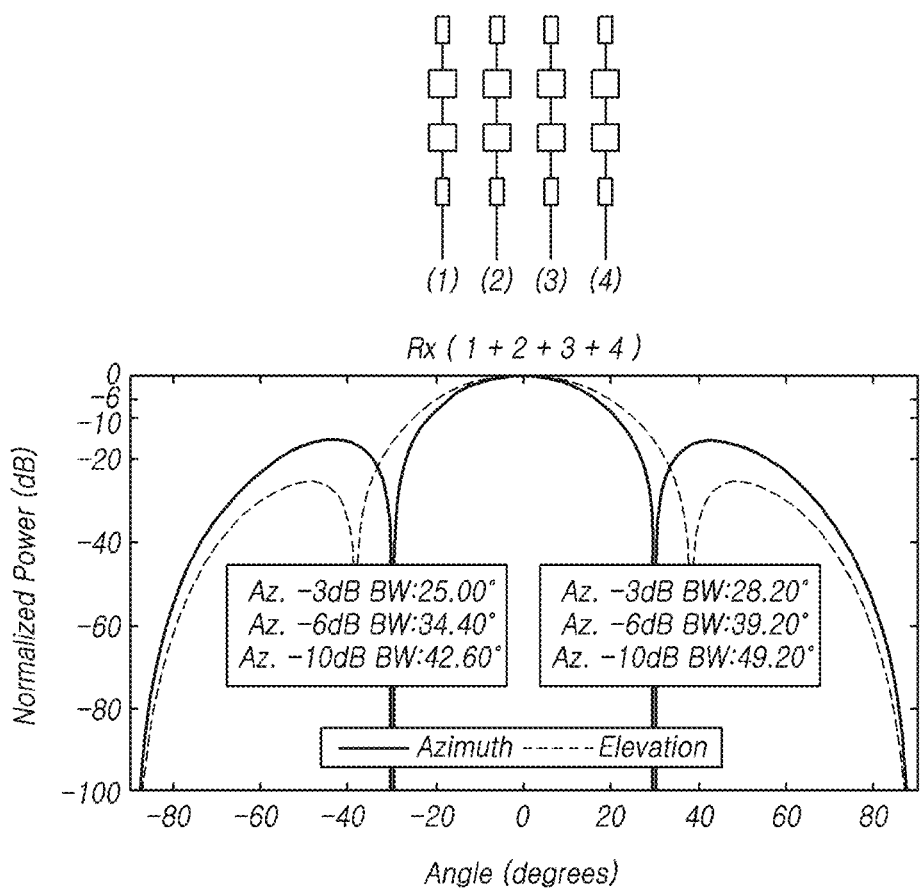
FIGS. 19 and 20 are diagrams comparing the signal performance of an antenna structure satisfying the parameter conditions of the array antenna structure for a vehicle radar according to the present disclosure and the signal performance of an antenna structure not satisfying the same parameter conditions.
Figure 20:
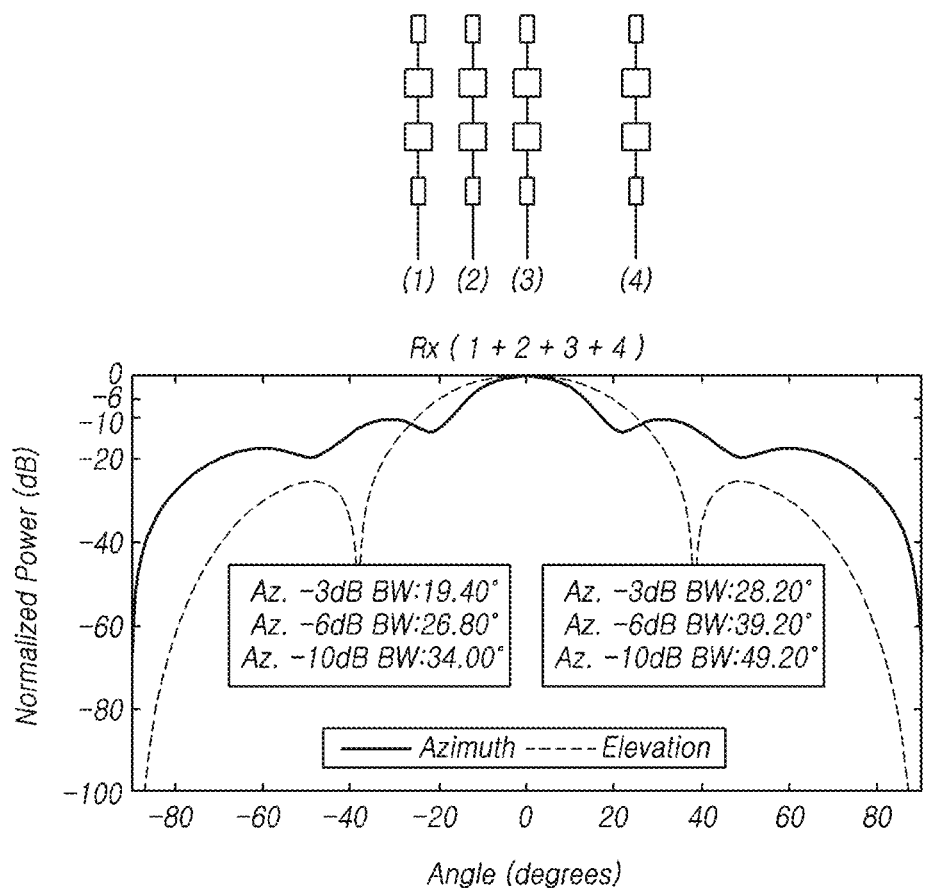

FIGS. 19 and 20 are diagrams comparing the signal performance of an antenna structure satisfying the parameter conditions of the array antenna structure for a vehicle radar according to the present disclosure and the signal performance of an antenna structure not satisfying the same parameter conditions.

FIG. 19 is a case in which the channel distance d of the short range receiver antenna Rx-Short 110, among the parameter conditions of the array antenna structure for a vehicle radar according to the present disclosure, is maintained to be equal, while FIG. 20 is a case in which the channel distance d of the short range receiver antenna Rx-Short 110, among the parameter conditions of the array antenna structure for a vehicle radar according to the present disclosure, is not equal. As illustrated in FIG. 20, in the array antenna structure for a vehicle radar according to the present disclosure, it is apparent that, if the channel distance of the short range receiver antenna Rx-Short 110 is not equal, the performance produced by the four short range receiver antennas Rx-Short 110 is deteriorated sharply.

Figure 21:
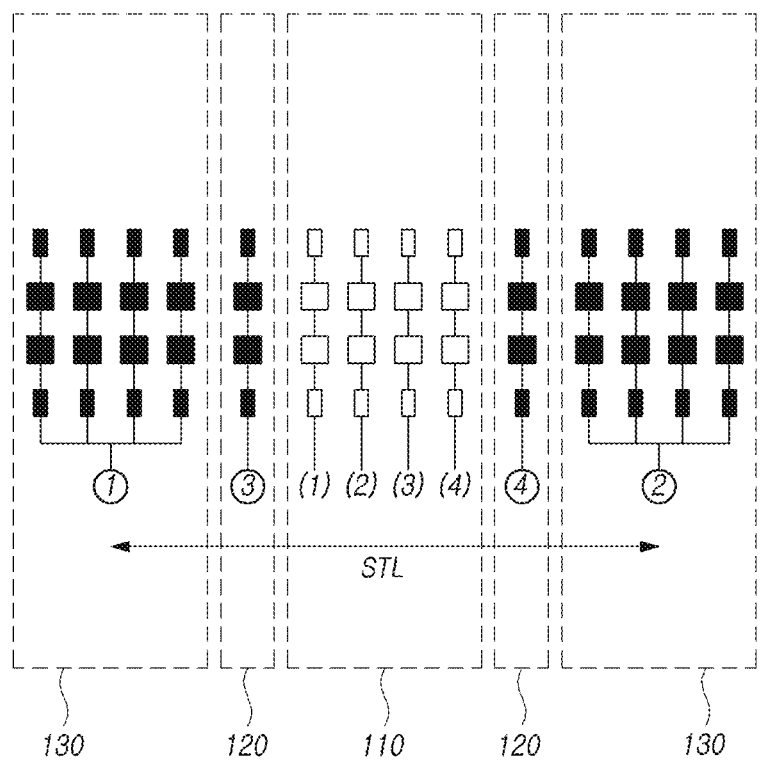

FIGS. 21 and 22 are diagrams illustrating an array antenna structure and specific conditions thereof in a case in which the channel distance STL of the long range transmitter antenna Tx-Long 130 does not satisfy the parameter conditions of the array antenna structure for a vehicle radar according to the present disclosure.

Among the parameter conditions of the array antenna structure for a vehicle radar according to the present disclosure, the number ATL of array antennas per channel and the channel distance STL of the long range transmitter antenna Tx-Long 130 are required to be ATL=CRS+2 and STL=2 (CRS+2)*d, respectively. Since the number CRS of channels of the short range receiver antenna Rx-Short 110 is 4, the number ATL of array antennas per channel and the channel distance STL of the long range transmitter antenna Tx-Long 130 should satisfy the following conditions: ATL=4+2=6 and STL=2(4+2)*d=12d. In this case, however, the number ATL of array antennas per channel of the long range transmitter antenna Tx-Long 130 is only 4, and thus, the parameter conditions of the array antenna structure for a vehicle radar according to the present disclosure are not satisfied. As a result, the signal performance of the array antennas for a vehicle radar is deteriorated.

Figure 23:
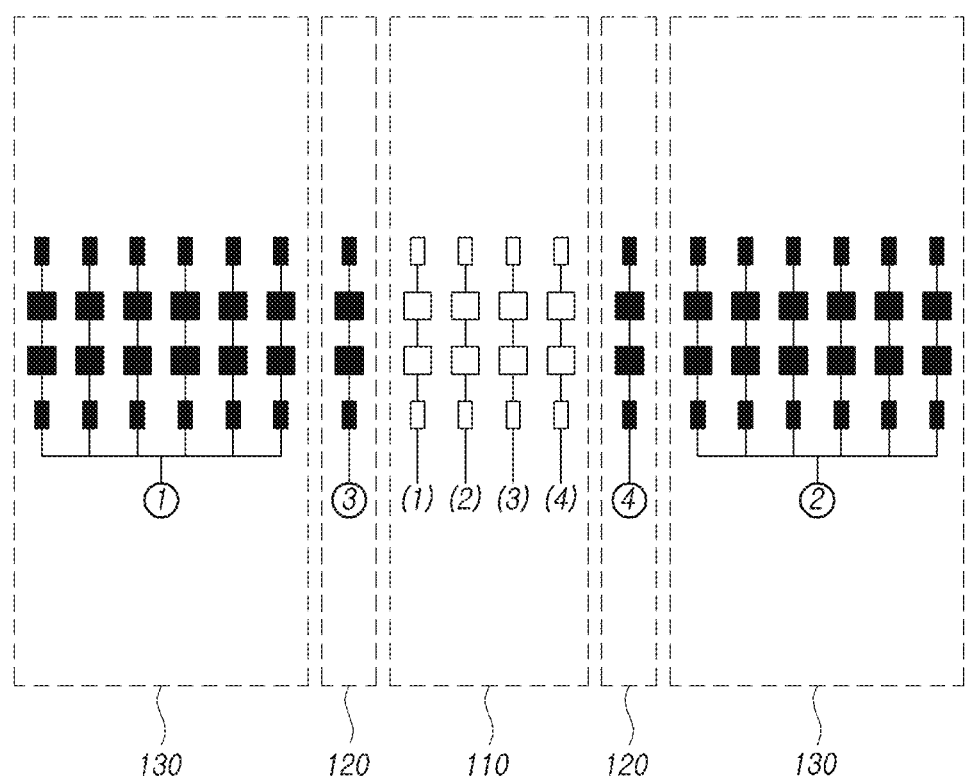

FIGS. 23 and 24 are diagrams illustrating an array antenna structure and specific conditions thereof in a case in which the channel distance STL of the long range transmitter antenna Tx-Long 130 does not satisfy the parameter conditions of the array antenna structure for a vehicle radar according to the present disclosure.

As described above, among the parameter conditions of the array antenna structure for a vehicle radar according to the present disclosure, the number ATL of array antennas per channel and the channel distance STL of the long range transmitter antenna Tx-Long 130 are required to be ATL=CRS+2 and STL=2(CRS+2)*d, respectively. Since the number CRS of channels of the short range receiver antenna Rx-Short 110 is 4, the number ATL of array antennas per channel and the channel distance STL of the long range transmitter antenna Tx-Long 130 should satisfy the following conditions: ATL=4+2=6 and STL=2(4+2)*d=12d. In this case, however, the number ATL of array antennas per channel of the long range transmitter antenna Tx-Long 130 is 8 and the channel distance STL is 18d, and thus, the parameter conditions of the array antenna structure for a vehicle radar according to the present disclosure are not satisfied. As a result, the signal performance of the array antennas for a vehicle radar is deteriorated.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An array antenna structure for a vehicle radar, comprising:
    a short range receiver antenna;
    a short range transmitter antenna split into sections disposed to left and right of outside of the short range receiver antenna, respectively;
    a long range transmitter antenna split into sections disposed to left and right of outside of the short range transmitter antenna, respectively; and
    a long range receiver antenna disposed to left of the left section of the long range transmitter antenna or to right of the right section of the long range transmitter antenna.

2. The array antenna structure according to claim 1, wherein the short range receiver antenna includes a plurality of channels having an equal distance or a predetermined specific distance and a distance set as a multiple of the specific distance.

3. The array antenna structure according to claim 2, wherein short range receiver antenna is configured such that a single array antenna is disposed for each of the channels.

4. The array antenna structure according to claim 1, wherein the short range transmitter antenna is configured such that a single channel is disposed to left of the outside of the short range receiver antenna and another single channel is disposed to right of the outside of the short range receiver antenna.

5. The array antenna structure according to claim 4, wherein the short range transmitter antenna is configured such that a single array antenna is disposed for each of the channels.

6. The array antenna structure according to claim 1, wherein the long range transmitter antenna is configured such that a single channel is disposed to left of the outside of the short range transmitter antenna and another single channel is disposed to right of the outside of the short range transmitter antenna.

7. The array antenna structure according to claim 6, wherein the long range transmitter antenna is configured such that a single array antenna is disposed for each of the channels.

8. The array antenna structure according to claim 7, wherein the number of array antennas per channel of the long range transmitter antenna is determined to be proportional to the number of channels of the short range receiver antenna.

9. The array antenna structure according to claim 8, wherein the number of array antennas per channel of the long range transmitter antenna is greater than the number of channels of the short range receiver antenna by K.

10. The array antenna structure according to claim 8, wherein the number of array antennas per channel of the long range transmitter antenna is greater than the number of channels of the short range receiver antenna by 2.

11. The array antenna structure according to claim 1, wherein the long range receiver antenna includes a plurality of channels.

12. The array antenna structure according to claim 9, wherein the number of array antennas per channel of the long range receiver antenna is determined to be a value obtained by dividing two times the number of array antennas per channel of the long range transmitter antenna with a value smaller than the number of channels of the long range receiver antenna by 1.

13. The array antenna structure according to claim 1, wherein the long range transmitter antenna has a vertical offset.

14. The array antenna structure according to claim 1, wherein the long range receiver antenna has a vertical offset.

15. The array antenna structure according to claim 14, wherein, if the long range receiver antenna includes a plurality of channels, only the long range receiver antenna constituting one channel among the plurality of channels, located closest to or farthest from the long range transmitter antenna, has the vertical offset.

16. An array antenna alignment method for a vehicle radar, comprising:
   disposing a short range receiver antenna;
   disposing split sections of a short range transmitter antenna to left and right of outside of the short range receiver antenna, respectively;
   disposing split sections of a long range transmitter antenna to left and right of outside of the short range transmitter antenna, respectively; and
   disposing a long range receiver antenna to left of the left section of the long range transmitter antenna or to right of the right section of the long range transmitter antenna.

17. The array antenna alignment method according to claim 16, wherein the short range receiver antenna includes a plurality of channels having an equal distance, with a single array antenna being provided for each of the channels.

18. The array antenna alignment method according to claim 16, wherein the short range transmitter antenna is configured such that a single channel including a single array antenna is disposed to left of the outside of the short range receiver antenna and another single channel including a single array antenna is disposed to right of the outside of the short range receiver antenna.

19. The array antenna alignment method according to claim 16, wherein the long range transmitter antenna is configured such that a single channel including a plurality of array antennas is disposed to left of the outside of the short range transmitter antenna and another single channel including a plurality of array antennas is disposed to right of the outside of the short range transmitter antenna.

20. The array antenna alignment method according to claim 16, wherein the long range transmitter antenna has a vertical offset.

* * * * *